United States Patent [19]

Lecomte

[11] 4,264,242

[45] Apr. 28, 1981

[54] METHOD AND APPARATUS FOR DISTRIBUTING PULVERULENT OR PARTICULATE MATERIALS TO A PLURALITY OF DISPENSING POINTS, E.G. FOR SOWING SEEDS OR SPREADING FERTILIZER

[75] Inventor: Jean-Luc Lecomte, Montereau, France

[73] Assignee: Nodet Gougis S.A., Montereau, France

[21] Appl. No.: 60,219

[22] Filed: Jul. 24, 1979

[30] Foreign Application Priority Data

Aug. 10, 1978 [FR] France .............................. 78 23615

[51] Int. Cl.³ .......................... A01C 7/16; A01C 15/00
[52] U.S. Cl. ..................................... 406/155; 111/73; 239/565; 239/564; 406/181
[58] Field of Search ..................... 222/1; 406/155, 156, 406/181, 197; 111/34, 73, 77; 239/565, 8, 654

[56] References Cited

U.S. PATENT DOCUMENTS

| | | | |
|---|---|---|---|
| 3,189,230 | 6/1965 | Gillespie | 406/127 |
| 3,567,288 | 3/1971 | Wood | 406/156 |
| 3,631,825 | 1/1972 | Weiste | 239/655 X |
| 4,007,969 | 2/1977 | Aubin et al. | 406/181 |

*Primary Examiner*—Joseph J. Rolla
*Assistant Examiner*—Fred A. Silverberg
*Attorney, Agent, or Firm*—Diller, Ramik & Wight

[57] ABSTRACT

Method and apparatus for distributing pulverulent or particulate materials to a plurality of dispensing points, e.g., for sowing seeds or spreading fertilizer. A supply conduit carrying a main stream of material, for example, entrained in air, arrives at the center of a distributor head with a circular periphery. A deflector or distributor cone or a revolving nozzle distributes the material to a plurality of inlet ends of discharge hoses. Pairs of discharge hoses with their inlet ends located diametrically opposite each other are combined for supplying each dispensing point with a constant uniform flow rate irrespective of the inclination of the distributor head when operating on rough terrain.

6 Claims, 4 Drawing Figures

METHOD AND APPARATUS FOR DISTRIBUTING PULVERULENT OR PARTICULATE MATERIALS TO A PLURALITY OF DISPENSING POINTS, E.G. FOR SOWING SEEDS OR SPREADING FERTILIZER

BACKGROUND OF THE INVENTION

The present invention relates to a method and apparatus for distributing pulverulent or particulate materials.

The invention is more particularly concerned with the dispensing of materials for use in agriculture, namely by means of spreaders or seeders.

Presently known apparatus as described in French Pat. Nos. 616,346 and 1,148,922 generally comprise a distributor head supplied by a storage hopper, a single supply conduit connecting the hopper to the distributor head and a plurality of discharge conduits connecting the distributor head to different dispensing points or stations.

In known static distributors, namely those disclosed in U.S. Pat. Nos. 3,189,230 and 3,631,825 the single supply conduit opens vertically at the apex of the central deflector or distributor cone around the base of which the inlet ends of discharge conduits are uniformly spaced.

BRIEF DESCRIPTION OF THE INVENTION

According to the invention there is provided an apparatus for carrying out the method, comprising a distributor head having a circular periphery, a main supply conduit having an outlet end opening substantially at the center of the distributor head, a plurality of discharge conduits having their inlet ends at uniformly spaced locations around the circular periphery of the distributor head, the number of discharge conduits being a whole number multiple of the number of dispensing points, the discharge conduits being combined into a number of conduits equal to the number of dispensing points, each such conduit being fed by the same number of discharge conduits, the inlet ends of discharge conduits feeding the same combined conduit being uniformly spaced around the circular periphery of the distributor head.

Preferably the apparatus comprises twice the number of discharge conduits as there are dispensing points, the discharge conduits being joined in pairs, each pair of discharge conduits feeding a dispensing point, the inlet ends of each pair of discharge conduits being located diametrically opposite each other along the circular periphery of the distributor head.

As a result when the distributor head is tilted the drop in the flow rate to one of the discharge conduit inlets to one side of the head is compensated by the increase in flow through an inlet end on the opposite side whereby each dispensing point will be supplied by a low and high flow rate the sum of which will be sustantially equal for each of the dispensing points. The dispensing points thus receive a continuous uniform supply which is of the same order for all the dispensing points along the effective width of the vehicle.

DETAILED DESCRIPTION OF THE DRAWING FIGURES

Figure 1:
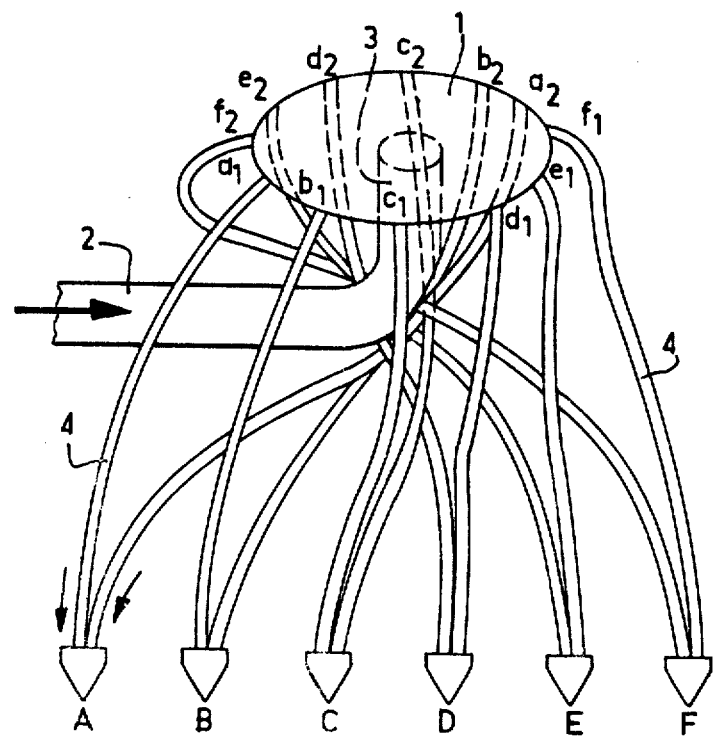
Figure 3:
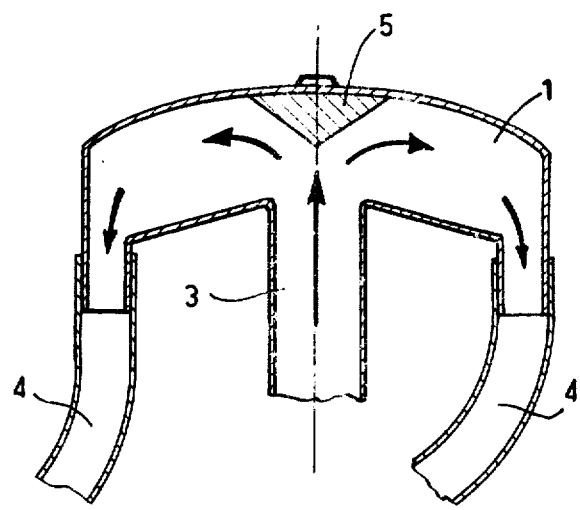
Figure 2:
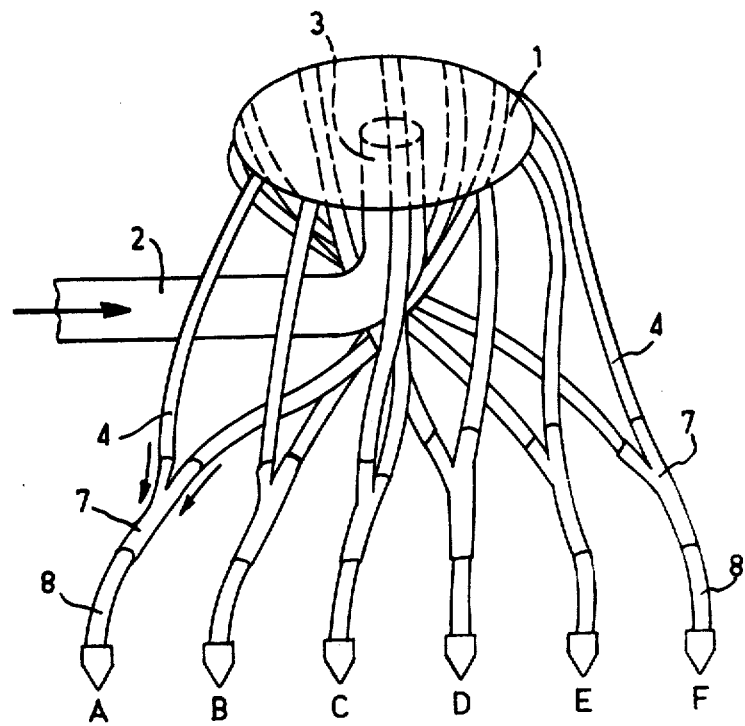
Figure 4:
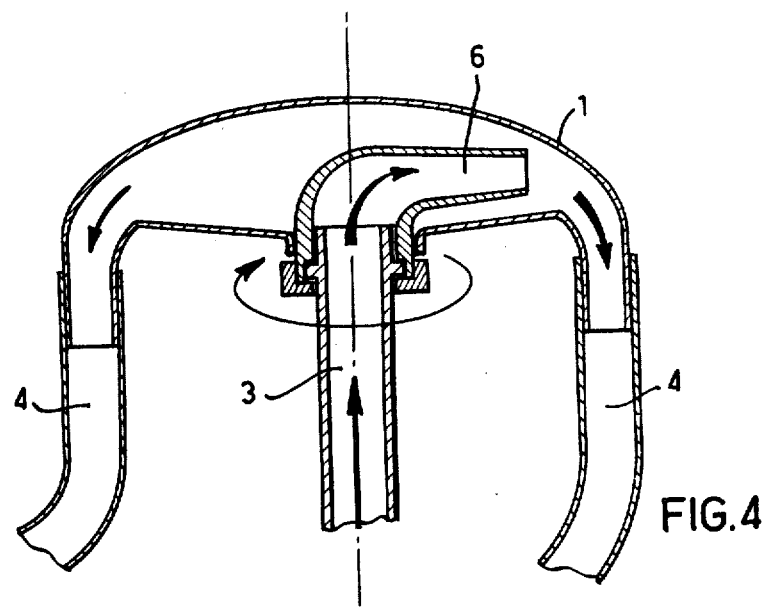

The invention will now be described in greater detail with reference to particular embodiments disclosed by way of non limiting examples and illustrated in the accompanying drawings, in which:

FIG. 1 schematically illustrates, in perspective, apparatus embodying the invention;

FIG. 2 illustrates an alternative embodiment of the invention;

FIG. 3 illlustrates a cross-sectional view of a distributor head with a central distributor cone; and FIG. 4 illustrates a cross-sectional view of a revolving type distributor head.

DETAILED DESCRIPTION OF THE INVENTION

As illustrated in FIG. 1 the apparatus according to the invention comprises a distributor head 1 having a circular periphery supplied at its center by a supply conduit 2 feeding pulverulent or particulate materials from a storage hopper (not shown). In a first embodiment of FIG. 1 the apparatus operates pneumatically such that a stream of air entrains materials to be supplied to the distributor head 1, the supply conduit 2 comprising an upstanding portion 3 with its outlet end opening at the center of the distributor head 1. Along the circular periphery of the distributor head 1 are uniformly spaced inlet ends a1,a2,b1,b2 . . . of the flexible discharge conduits or hoses 4 connecting the distributor head 1 to the dispensing points or stations A,B,C, D, E and F which may be shares if the apparatus is fitted on a seeder, or spreading means if the apparatus is fitted on a fertilizer or other kind of spreader.

It will be noted that the number of discharge hoses 4 is twice the number of dispensing points, each dispensing point, A, B, C, D, E and F being supplied by two hoses 4 with their inlet ends disposed diametrically opposite each other along the periphery of the distributor head 1.

Thus, in FIG. 1, the dispensing point A formed as a share is supplied by two hoses 4 as indicated by arrows, the inlet ends of the hoses 4 are of two diametrically opposite points a1 and a2 along the circular periphery of the distributor head 1. Likewise, the dispensing point B, also formed as a share, is supplied by hoses having their inlet ends at diametrically opposed points b1 and b2, and so on.

In the embodiment of FIG. 1 the materials are entrained by air from the storage hopper through conduit 2 and its upstanding portion 3 to the distributor head 1 wherein the air-material stream is either projected against a central deflector cone 5 whose apex points towards the outlet orifice of the supply conduit 2, along the axis thereof (FIG. 3). Alternatively the air-material stream is distributed around the circular peripheral wall of the distributor head 1 by a revolving elbow nozzle 6 rotatably mounted at the outlet end of the supply conduit 2 as shown in FIG. 4. In the first embodiment (FIG. 3) with a static central deflector or distributor cone the main stream exiting the supply conduit 2 is broken up into as many continuous intermediary streams with substantially constant flow rates as there are discharge hoses 4, that is to say, a whole number multiple of dispensing points or stations. In the second embodiment (FIG. 4) with a revolving nozzle the main stream is chopped into the same number of parts as there are successive passages of the outlet orifice of the revolving nozzle by the inlet ends of the discharge hoses 4, the intermediary stream thus formed in each of the discharge hoses or conduits 4 is accordingly not of substantially constant flow rate as in the first embodiment;

on the contrary, these flow rates fluctuate at a frequency which is a function of the speed of rotation of the nozzle and the number of discharge hoses or conduits.

In either case the dispensing points (a share or a spreader element) are fed by the intermediary streams coming from two discharge hoses 4 the inlet ends of which are diametrically opposite each other along the circular periphery of the distributor head 1 whereby irrespective of the inclination or tilting of the distributor head when the associated vehicle or piece of agricultural equipment travels over hilly terrain or on a slope thereby causing differences in the flow rates of the distributed streams, low flow rate streams conveyed to a dispensing point are combined with the high flow rate streams through the opposite discharge conduit and the total flow rates at the various dispensing points are all substantially the same. Note that the diametrically opposed inlet ends located on a diameter perpendicular to the slope or incline are fed with substantially equal streams. The supply of each dispensing point is thus at a substantially constant uniform flow rate.

The connection of associated conduits or hoses 4 whose inlet ends are diametrically opposite each other may be effected in two different ways, i.e., directly at the different dispensing points A, B, C, D, E and F (FIG. 1) or by means of Y-connectors designated by reference numerals 7 in FIG. 2, in the later case the connectors in turn are connected by combined hoses or conduits 8 to the various dispensing points.

According to a modified embodiment the mixing of the opposed intermediate streams is done before their dispensing point which is fed at a uniform flow rate at a substantially constant rate of the entrained product.

On the above described embodiments the apparatus operates pneumatically but obviously it may be by other means, namely simple gravity feed, in which case the supply conduit 2 arrives at the center of the distributor head from above and not from below.

Of course the invention is not limited to the described and illustrated embodiments given by way of non-limiting examples but also covers all modifications and alternatives without departing from the spirit and scope of the invention.

Thus instead of associating the tubes in pairs it is possible to group them in greater numbers on condition that the inlet ends of the tubes are at uniformly spaced locations around the distributor head.

What is claimed is:

1. A method for distributing pulverulent or particulate materials among a plurality of dispensing points, comprising the steps of
   (a) providing a main stream of the material
   (b) dividing the main stream into a plurality of intermediary streams;
      (i) the number of intermediary streams being a whole number multiple of the number of dispensing points;
      (ii) the number of intermediary streams feeding each dispensing point being the same; and
   (c) combining the intermediary streams so that the total flow rate of each combined stream which is equal to the flow rates of its intermediary streams is substantially the same for each combined stream.

2. A method according to claim 1, wherein step b(i) further comprises dividing said main stream into twice as many intermediary streams as there are dispensing points; and step (c) further comprises
   combining the intermediary streams in pairs so that the flow rate of each combined pair of streams is equal to that of the other combined pairs of intermediary streams.

3. A method according to claim 1 or 2, wherein step (a) comprises entraining the material in an air stream.

4. Apparatus for distributing pulverulent or particulate material among a plurality of dispensing points, comprising
   (a) a distribution head having a circular periphery;
   (b) a main supply conduit having an outlet end opening substantially at the center of said distributing head;
   (c) a plurality of discharge conduits having their inlet ends at uniformly spaced locations around the circular periphery of said distribution head;
      (i) the number of discharge conduits being a whole number multiple of the number of dispensing points;
   (d) means combining said discharge conduits into a number of combined conduits equal to the number of dispensing points;
      (i) each combined conduit being fed by the same number of discharge conduits; and
      (ii) the inlet ends of said discharge conduits feeding the same combined conduit being uniformly spaced from each other around the circular periphery of said distribution head.

5. Apparatus according to claim 4, wherein said number of discharge conduits is equal to twice the number of dispensing points, said means combining discharge conduits grouping then in pairs, and the inlet ends of each pair of discharge conduits being located diametrically opposite each other along the circular periphery of said distributor head.

6. Apparatus according to claim 4 or 5, wherein said apparatus is part of a seeder or spreader.

* * * * *